United States Patent
Kubota et al.

(10) Patent No.: US 11,316,987 B2
(45) Date of Patent: Apr. 26, 2022

(54) VOICE INFORMATION PROCESSING APPARATUS AND RECORDING MEDIUM THAT PROVIDE INFORMATION IN RESPONSE TO USER QUESTION

(71) Applicant: Konica Minolta, Inc., Tokyo (JP)

(72) Inventors: Hirokazu Kubota, Otsu (JP); Junichi Hase, Osaka (JP)

(73) Assignee: Konica Minolta, Inc., Tokyo (JP)

( * ) Notice: Subject to any disclaimer, the term of this patent is extended or adjusted under 35 U.S.C. 154(b) by 73 days.

(21) Appl. No.: 16/804,144

(22) Filed: Feb. 28, 2020

(65) Prior Publication Data

US 2020/0304651 A1   Sep. 24, 2020

(30) Foreign Application Priority Data

Mar. 18, 2019   (JP) .............................. JP2019-049387

(51) Int. Cl.
*H04N 1/00* (2006.01)
*G10L 15/22* (2006.01)

(52) U.S. Cl.
CPC ......... *H04N 1/00209* (2013.01); *G10L 15/22* (2013.01); *H04N 1/00403* (2013.01); *H04N 1/00954* (2013.01); *G10L 2015/223* (2013.01)

(58) Field of Classification Search
CPC .......... H04N 1/00209; H04N 1/00954; H04N 1/00403; G10L 15/22; G10L 2015/223; G10L 2015/227; G10L 17/00; G06F 3/167; H04L 51/22
See application file for complete search history.

(56) References Cited

U.S. PATENT DOCUMENTS

| | | | |
|---|---|---|---|
| 10,748,529 B1 * | 8/2020 | Milden | G10L 15/22 |
| 2018/0262834 A1 * | 9/2018 | Cho | G06F 3/167 |
| 2018/0336905 A1 * | 11/2018 | Kim | G10L 15/22 |
| 2019/0295542 A1 * | 9/2019 | Huang | G10L 15/30 |
| 2020/0098358 A1 * | 3/2020 | Rakshit | G10L 15/22 |

FOREIGN PATENT DOCUMENTS

JP   2018-018439 A   2/2018

* cited by examiner

*Primary Examiner* — Mohammad H Ghayour
*Assistant Examiner* — Pawan Dhingra
(74) *Attorney, Agent, or Firm* — Osha Bergman Watanabe & Burton LLP

(57) ABSTRACT

A voice information processing apparatus includes: a hardware processor that: receives a user question; acquires answer information responsive to the received question; acquires state information on a user state; and selects an output mode of the answer information from among a plurality of output modes, based on the answer information and the state information, the plurality of output modes including a voice output mode; and an output device that outputs the answer information in the selected output mode.

10 Claims, 12 Drawing Sheets

FIG. 6A

| 23 | | | SCHEDULE INFORMATION | | | | |
|---|---|---|---|---|---|---|---|
| TYPE OF ANSWER INFORMATION | CONFIDENTIAL INFORMATION | REQUIRED OUTPUT TIME | GOING OUT / MEETING SCHEDULE | LISTENING POSSIBLE | GOING-OUT TIME | ENVIRONMENT ALLOWING CHARGING | OUTPUT MODE |
| TEXT | NOT INCLUDED | LONGER THAN OR EQUAL TO SET TIME | NOT SCHEDULED | — | — | — | E-MAIL TRANSMISSION (DIRECT TRANSMISSION) |
| | | | SCHEDULED | — | LESS THAN PREDETERMINED TIME | — | E-MAIL TRANSMISSION (DIRECT TRANSMISSION) |
| | | | | — | LONGER THAN OR EQUAL TO PREDETERMINED TIME | YES | E-MAIL TRANSMISSION (DIRECT TRANSMISSION) |
| | | | | | | NO | PRINT OUTPUT |
| | | LESS THAN SET TIME | NOT SCHEDULED | — | — | — | VOICE OUTPUT |
| | | | SCHEDULED | YES | — | — | VOICE OUTPUT |
| | | | | NO | LESS THAN PREDETERMINED TIME | — | E-MAIL TRANSMISSION (DIRECT TRANSMISSION) |
| | | | | | LONGER THAN OR EQUAL TO PREDETERMINED TIME | YES | E-MAIL TRANSMISSION (DIRECT TRANSMISSION) |
| | | | | | | NO | PRINT OUTPUT |
| | INCLUDED | — | — | — | — | — | E-MAIL TRANSMISSION (DIRECT TRANSMISSION) |

| TYPE OF ANSWER INFORMATION | CONFIDENTIAL INFORMATION | REQUIRED OUTPUT TIME | SCHEDULE INFORMATION | | | | OUTPUT MODE |
| --- | --- | --- | --- | --- | --- | --- | --- |
| | | | GOING OUT / MEETING SCHEDULE | LISTENING POSSIBLE | GOING-OUT TIME | ENVIRONMENT ALLOWING CHARGING | |
| IMAGE | NOT INCLUDED | – | NOT SCHEDULED | – | – | – | E-MAIL TRANSMISSION (DIRECT TRANSMISSION) |
| | | | SCHEDULED | – | LESS THAN PREDETERMINED TIME | – | E-MAIL TRANSMISSION (DIRECT TRANSMISSION) |
| | | | | – | LONGER THAN OR EQUAL TO PREDETERMINED TIME | YES | E-MAIL TRANSMISSION (DIRECT TRANSMISSION) |
| | | | | | | NO | PRINT OUTPUT |
| | INCLUDED | – | – | – | – | – | E-MAIL TRANSMISSION (DIRECT TRANSMISSION) |

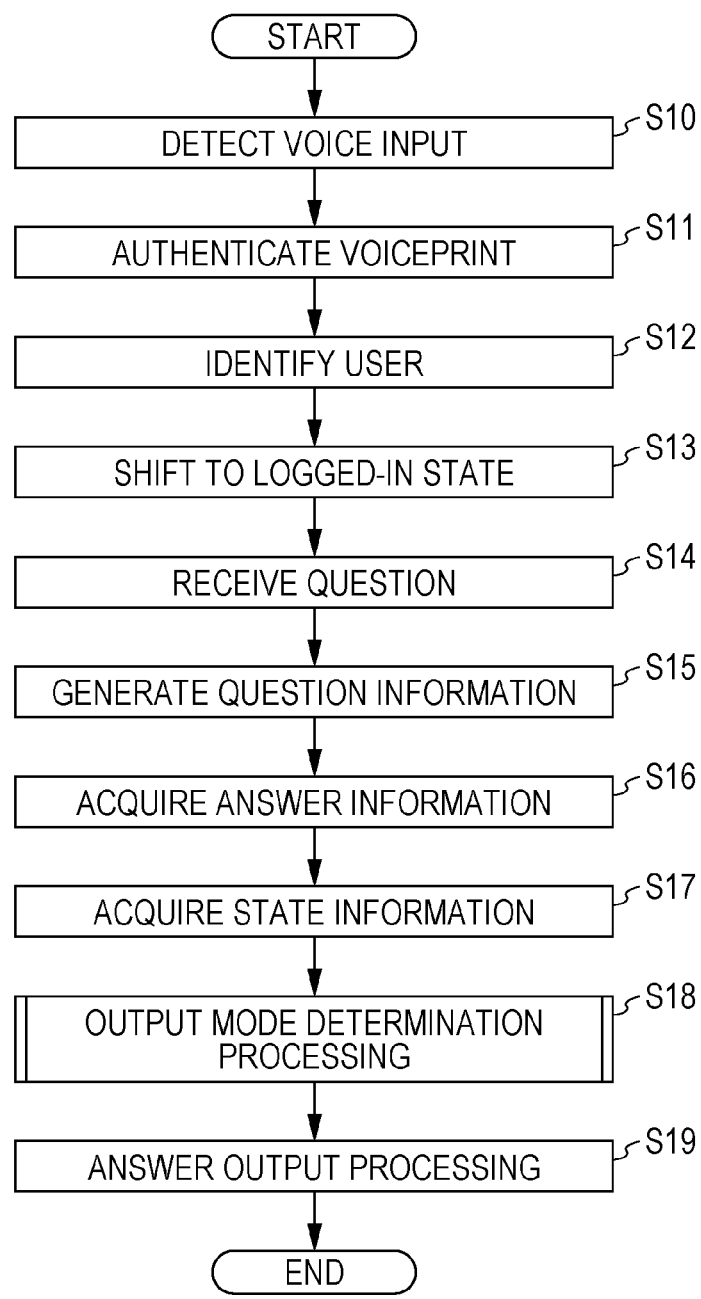

VOICE INFORMATION PROCESSING APPARATUS AND RECORDING MEDIUM THAT PROVIDE INFORMATION IN RESPONSE TO USER QUESTION

CROSS-REFERENCE TO RELATED APPLICATION

The entire disclosure of Japanese patent Application No. 2019-049387, filed on Mar. 18, 2019, is incorporated herein by reference in its entirety.

BACKGROUND

Technical Field

The present invention relates to a voice information processing apparatus and a recording medium.

Description of the Related Art

Voice guidance apparatuses that perform voice guidance in a plurality of languages have been known which output a necessary message completely to the extent of falling within a prelimited reproduction time (for example, JP 2018-18439 A). In this conventional technique, a standard-pattern guidance message whose reproduction time is relatively long, and a short-pattern guidance message whose reproduction time is shorter than that of the standard pattern are prepared. When only Japanese is chosen, the standard-pattern guidance message is reproduced. When Japanese and English are chosen, the short-pattern guidance message is reproduced. With this, the output can be completed in the prelimited reproduction time.

In recent years, voice information processing apparatuses called AI speakers and the like have become remarkably widespread. Using such a voice information processing apparatus allows a user to operate various apparatuses by voice, or ask a question by voice, thereby obtaining an answer by voice output. That is, since the user does not need to manually operate a keyboard etc., even when the user's hands are dirty or hold bags, the voice information processing apparatus can output an answer to the user's question in a voice interaction form.

However, when the user asks a question by voice, the output time of an answer output from the voice information processing apparatus may be unexpectedly long, and the user may not be able to listen to the voice answer to the end in some cases. For example, when the user asks about the route to a destination and the congestion situation in the route immediately before going out of the office, the voice information processing apparatus will provide the route to the destination specified by the user and the congestion situation in the route by voice output. If the route to the destination is complicated or long, the output time of the answer output from the voice information processing apparatus is long, and the voice output may not be completed by the time the user has to go out. In this case, the user cannot listen to the answer output from the voice information processing apparatus to the end and cannot obtain enough information.

Further, if the user asks the voice information processing apparatus a question by voice just before quitting time, the voice information processing apparatus may output an answer by voice for a long time beyond the quitting time.

In particular, this type of voice information processing apparatus acquires various answers according to the user's questions, using AI or the like of a server installed in a cloud or the like on the Internet. Therefore, it is impossible to prepare pre-patterned answers as in the conventional technique of JP 2018-18439 A, and the output time of an answer by voice cannot be limited to a certain range.

SUMMARY

One or more embodiments of the present invention provide a voice information processing apparatus and a recording medium storing a program that can receive a user's question and provide enough information to the user as an answer to the question, and further can provide the information in a mode easily available to the user.

According to one or more embodiments of the present invention, a voice information processing apparatus comprises: an outputter (or output device) that is able to output an answer information in a plurality of output modes including voice output; and a hardware processor that: receives a user's question; acquires the answer information to the received question (i.e., answer information responsive to the user's question); acquires state information on the user's state; and selects an output mode of the answer information from among the plurality of output modes, based on the answer information and the state information, and controls the output mode by the outputter.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 6A is a diagram showing an example of determination information according to one or more embodiments;

FIG. 6B is a diagram showing an example of determination information according to one or more embodiments;

FIG. 7 is a flowchart showing an example of a procedure performed by the voice information processing apparatus according to one or more embodiments;

DETAILED DESCRIPTION

Figure 1:
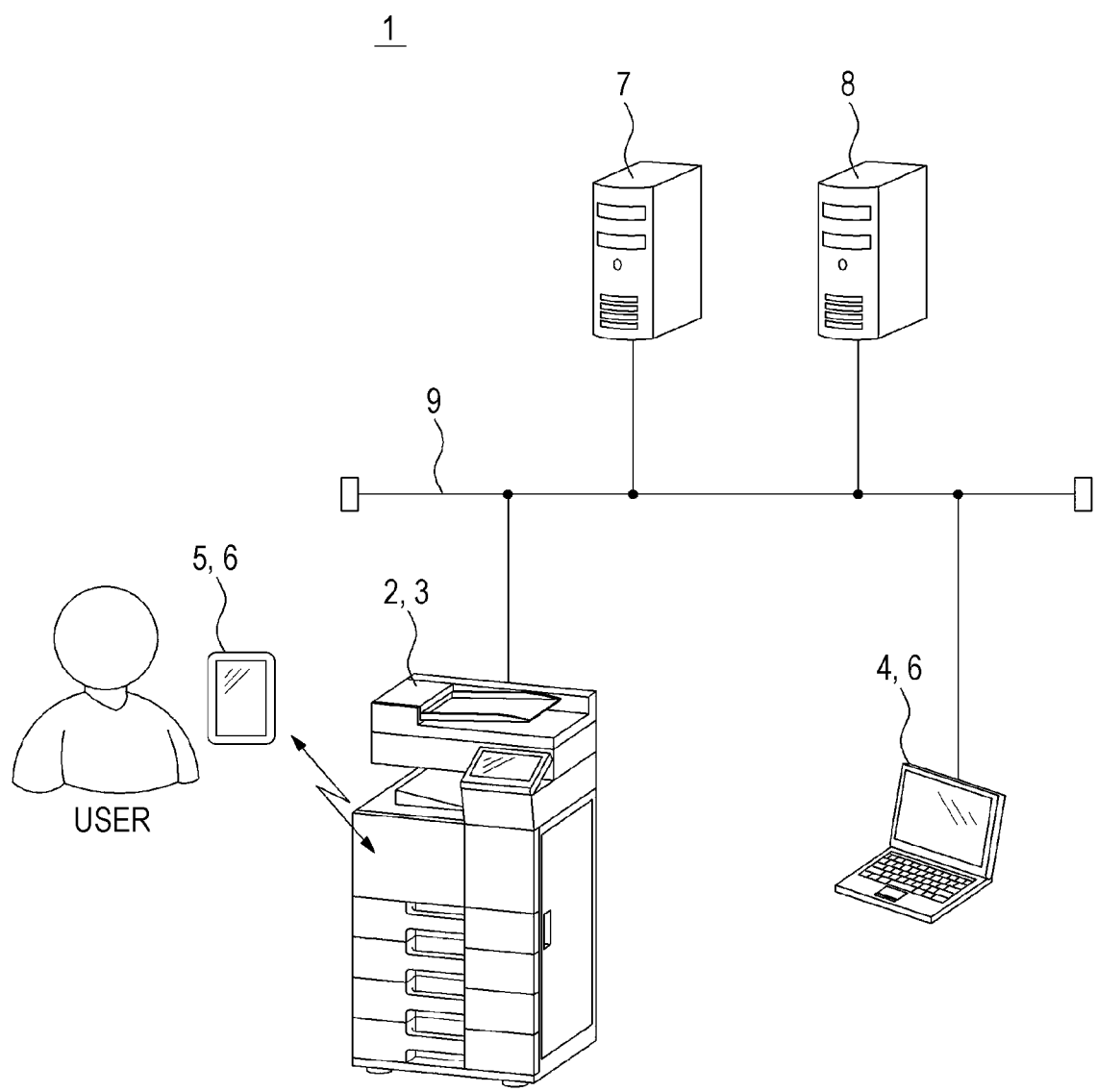
FIG. 1 is a diagram showing an example of an overall configuration of an information processing system according to one or more embodiments.

Hereinafter, embodiments of the present invention will be described with reference to the drawings. However, the scope of the invention is not limited to the disclosed embodiments. In the embodiments described below, the same reference numerals are assigned to the same elements without duplicated explanations of them.

FIG. 1 is a diagram showing an example of an overall configuration of an information processing system 1 according to one or more embodiments of the present invention. The information processing system 1 includes an image processing apparatus 2 such as an MFP, a personal computer (PC) 4, a portable terminal 5 such as a tablet terminal or a smartphone, an answer search server 7 that generates answer information to a question, and a management server 8 that manages users' states, schedules, etc. These can communicate with each other via a network 9 such as a local area network (LAN). Both the PC 4 and the portable terminal 5 are information processing terminals 6 that can be carried by a user, and are terminals that can be used even while on the go by being charged in advance. In the case illustrated in FIG. 1, the answer search server 7 and the management server 8 are installed in the user's local environment, but are not limited to this. For example, they may be installed in a cloud on the Internet.

The image processing apparatus 2 has a plurality of functions related to image processing such as a scan function, a print function, and a copy function, and executes jobs by operating the functions. For example, the image processing apparatus 2 can execute a print job by operating the print function to print text and an image on a sheet such as paper for output. The image processing apparatus 2 also has an e-mail transmission function and a function to perform wireless communication with the portable terminal 5 carried by the user.

Furthermore, the image processing apparatus 2 has a voice information processing function, and can receive the user's voice question, acquire answer information to the question, and output voice based on the answer information. That is, the image processing apparatus 2 of one or more embodiments functions as a voice information processing apparatus 3. Hereinafter, the image processing apparatus 2 will be described as the voice information processing apparatus 3.

The answer search server 7 is a server that searches for an answer to a question based on a request from the voice information processing apparatus 3, generates answer information based on the search result, and outputs the answer information to the voice information processing apparatus 3. The answer search server 7 acquires various answers according to users' questions, using AI or the like. For example, the answer search server 7 accesses various intra-company or extra-company databases, extracts at least one appropriate answer to a user's question, and generates answer information based on the extracted answer.

The management server 8 is a server that manages the stay-in-office state, schedule information, etc. of each user in the office. When the management server 8 receives an inquiry about the state of a user from the voice information processing apparatus 3, it generates state information indicating the state of the user and outputs the state information to the voice information processing apparatus 3.

Figure 2:
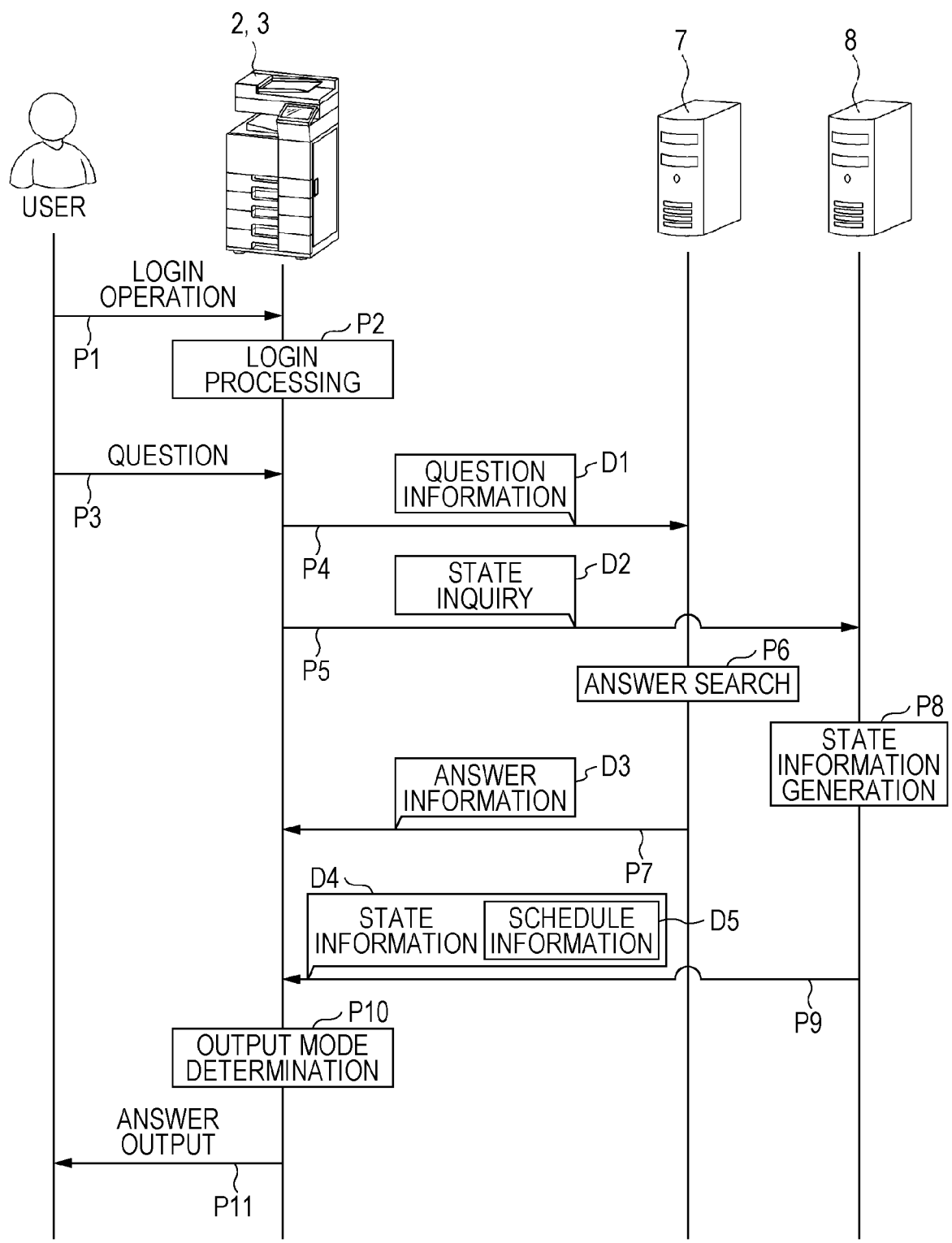
FIG. 2 is a diagram showing an operation example in the information processing system from when a voice information processing apparatus receives a user's voice question to when an answer is output, according to one or more embodiments.

FIG. 2 is a diagram showing an operation example in the information processing system 1 when the voice information processing apparatus 3 receives a user's voice question and outputs an answer. As shown in FIG. 2, to ask the voice information processing apparatus 3 a question by voice, the user performs a login operation on the voice information processing apparatus 3 (process P1). The login operation is performed by the user uttering a predetermined login keyword, for example. When the voice information processing apparatus 3 detects the voice input of the login keyword, it performs processing to identify the user by voiceprint authentication. When the user can be identified, the voice information processing apparatus 3 performs login processing to shift the operating state to a logged-in state (process P2). That is, the voice information processing apparatus 3 identifies the user who has uttered the login keyword as a logged-in user, and shifts to the logged-in state to receive voice input from the logged-in user. The shift of the voice information processing apparatus 3 to the logged-in state allows the user to ask the voice information processing apparatus 3 a question by voice.

The login operation by the user is not limited to the voice operation. For example, the user may perform the login operation by manually inputting a user ID, a password, or the like. If the voice information processing apparatus 3 is provided with a card information reading function, the user may perform an operation to cause the voice information processing apparatus 3 to read information recorded on a card carried by the user. Further, if the voice information processing apparatus 3 is provided with a function to read biological information such as a fingerprint or a vein, the user may perform an operation to cause the voice information processing apparatus 3 to read the user's biological information.

When the voice information processing apparatus 3 has shifted to the logged-in state, the user can ask the voice information processing apparatus 3 a question by uttering the question to ask to the voice information processing apparatus 3 (process P3). The voice information processing apparatus 3 that has shifted to the logged-in state is in a state of waiting for the logged-in user's voice question. Upon receiving the logged-in user's voice question, the voice information processing apparatus 3 generates question information D1 corresponding to the question, and transmits the question information D1 to the answer search server 7 (process P4). For example, the voice information processing apparatus 3 may generate the question information D1 including voice information uttered by the user as it is, or may convert the question input by the user into text data and generate the question information D1 including the text data. The question information D1 includes position information indicating the installation location of the voice information processing apparatus 3.

Further, upon receiving the logged-in user's voice question, the voice information processing apparatus 3 transmits a state inquiry D2 to the management server 8 to check the current state of the logged-in user (process P5).

When the answer search server 7 receives the question information D1 from the voice information processing apparatus 3, it performs answer search processing based on the question information D1 to acquire an appropriate answer to the user's question. For example, if the logged-in user asks the question "What's the weather outside?", the answer search server 7 identifies the location based on the position information included in the question information D1, and searches for the current weather at the identified location, thereby acquiring an appropriate answer to the question. The answer search server 7 that has acquired the appropriate answer to the question generates answer information D3 based on the answer (process P6). The answer information D3 includes at least text data. The answer information D3 may include data other than the text data. Data other than text data includes image data such as a figure and a photograph. For example, if the logged-in user asks the question "What is the route to the destination?" before going out, the answer search server 7 may generate the answer information D3 that includes both text data describing the route to the destination and image data indicating the route to the destination on a map. Then, the answer search server 7 transmits the answer information D3 to the voice information processing apparatus 3 (process P7).

When the management server 8 receives the state inquiry D2 from the voice information processing apparatus 3, it extracts the schedule information of the logged-in user and generates state information D4 indicating the state of the logged-in user (process P8). Then, the management server 8 transmits the state information D4 to the voice information processing apparatus 3 (process P9). The state information D4 includes at least schedule information D5 on the logged-in user.

When the voice information processing apparatus 3 acquires the answer information D3 and the state information D4, it performs processing to determine the output mode of the answer information D3 (process P10). The voice information processing apparatus 3 of one or more embodiments can output the answer information D3 mainly in three output modes: voice output mode, print output mode, and transmission mode such as email transmission (mode). In place of e-mail transmission, the answer information D3 may be output through direct transmission by wireless communication with the portable terminal 5. The voice information processing apparatus 3 selects at least one output mode from among those output modes, based on the answer information D3 and the state information D4. Then, the voice information processing apparatus 3 outputs the answer information D3 in the selected output mode, thereby providing the answer to the question to the logged-in user (process P11).

Figure 3:
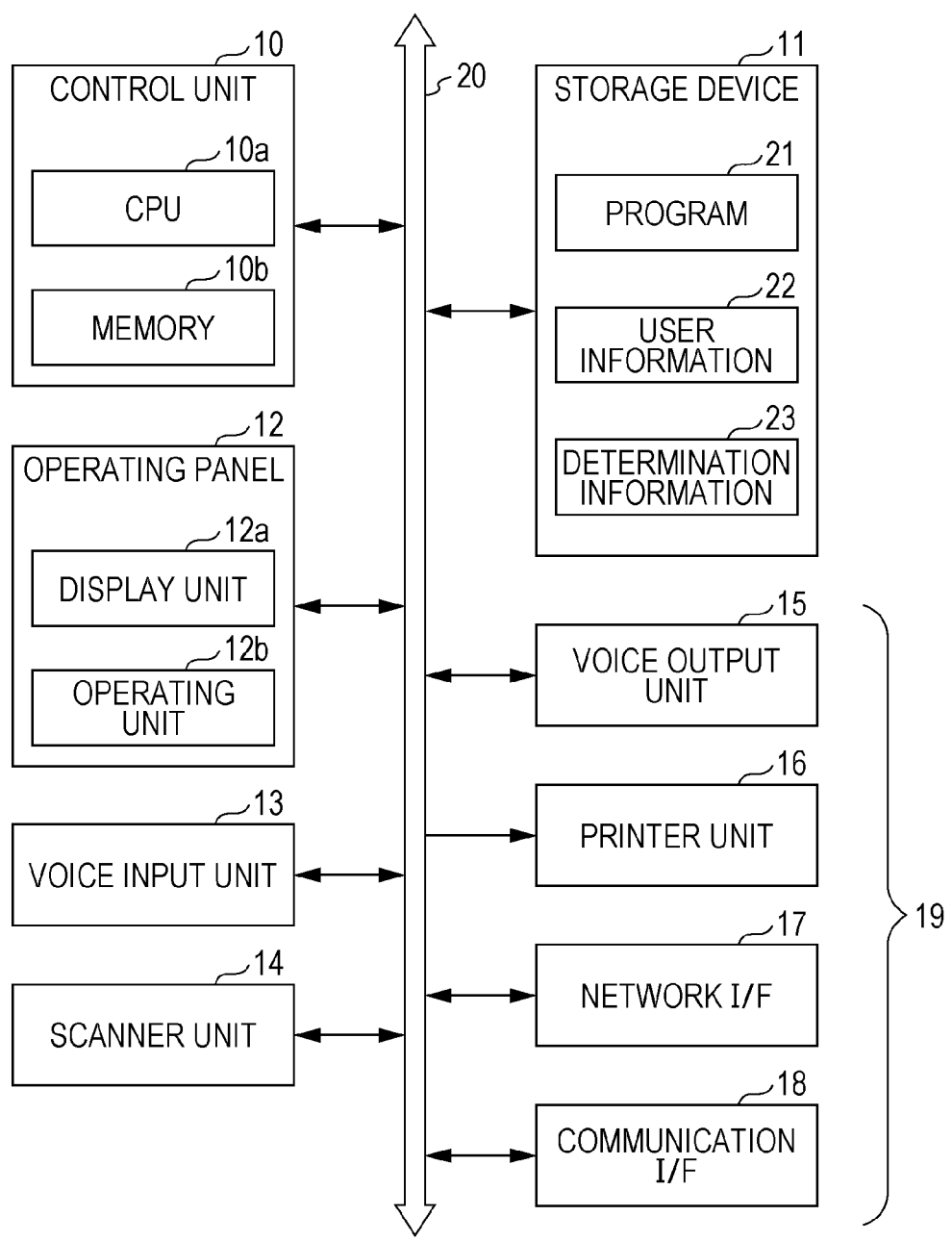
FIG. 3 is a diagram showing a hardware configuration of the voice information processing apparatus according to one or more embodiments.

Next, a configuration of the voice information processing apparatus 3 will be described. FIG. 3 is a diagram showing a hardware configuration of the voice information processing apparatus 3. The voice information processing apparatus 3 includes a control unit 10, a storage device 11, an operating panel 12, a voice input unit 13, a scanner unit 14, a voice output unit 15, a printer unit 16, a network interface 17, and a communication interface 18. These can mutually input and output data via a bus 20.

The control unit 10 includes a hardware processor or CPU 10*a* and a memory 10*b*, and controls the operation of each part. The CPU 10*a* reads and executes a program 21 stored in the storage device 11, thereby causing the control unit 10 to function as various processing units described later. The memory 10*b* is for storing temporary data etc. generated or acquired by the CPU 10*a* executing the program 21.

The storage device 11 is a nonvolatile storage unit such as a hard disk drive (HDD) or a solid-state drive (SSD). The program 21 to be executed by the CPU 10*a* is preinstalled in the storage device 11. User information 22 and determination information 23 are prestored in the storage device 11. The user information 22 is information in which information on users who can use the voice information processing apparatus 3 is preregistered. For example, in the user information 22, information on each user such as a user ID, a password, voiceprint information, a group to which the user belongs, and an e-mail address is registered. The determination information 23 is information that is referred to when the output mode of the answer information D3 is determined. Details of the determination information 23 will be described later.

In the storage device 11, although not shown, voice operation keywords are prestored. The voice operation keywords are information in which keywords for allowing the user to perform job setting and execution instruction by voice operation are registered.

The operating panel 12 serves as a user interface when the user uses the voice information processing apparatus 3. The operating panel 12 includes a display unit 12*a* that displays various types of information to the user, and an operating unit 12*b* that receives a manual operation by the user. For example, the display unit 12*a* is a color liquid crystal display. The operating unit 12*b* is composed of touch panel keys or the like arranged on the screen of the display unit 12*a*.

The voice input unit 13 includes a microphone to receive the input of the user's voice. When receiving the input of the user's voice, the voice input unit 13 outputs voice information corresponding to the voice to the control unit 10.

The scanner unit 14 optically reads a document and generates image data.

The voice output unit 15 includes a speaker and performs voice output to the user. For example, if voice output is selected as the output mode of the answer information D3, the control unit 10 drives the voice output unit 15 to output voice corresponding to the answer information D3.

The printer unit 16 prints text, an image, etc. on a sheet for output. For example, if print output is selected as the output mode of the answer information D3, the control unit 10 drives the printer unit 16 to print text and an image included in the answer information D3 on a sheet for output.

The network interface 17 is for connecting the voice information processing apparatus 3 to the network 9. The control unit 10 communicates with the answer search server 7, the management server 8, the PC 4, etc. via the network interface 17. If e-mail transmission is selected as the output mode of the answer information D3, the control unit 10 generates an e-mail designating the logged-in user's address as the destination, and transmits the e-mail via the network interface 17.

The communication interface 18 performs one-to-one wireless communication with, for example, the portable terminal 5 carried by the user. For example, when the communication interface 18 detects the portable terminal 5 within a communicable range of a radius of about several meters, it can establish a wireless connection state with the portable terminal 5 to directly transmit information output from the control unit 10 to the portable terminal 5. For example, if direct transmission to the portable terminal 5 is selected as the output mode of the answer information D3, the control unit 10 directly transmits text and an image included in the answer information D3 to the portable terminal 5 via the communication interface 18.

Thus, the voice information processing apparatus 3 of one or more embodiments includes four outputters (or output devices) 19: the voice output unit 15, the printer unit 16, the network interface 17, and the communication interface 18, as outputters for outputting the answer information D3.

Figure 4:
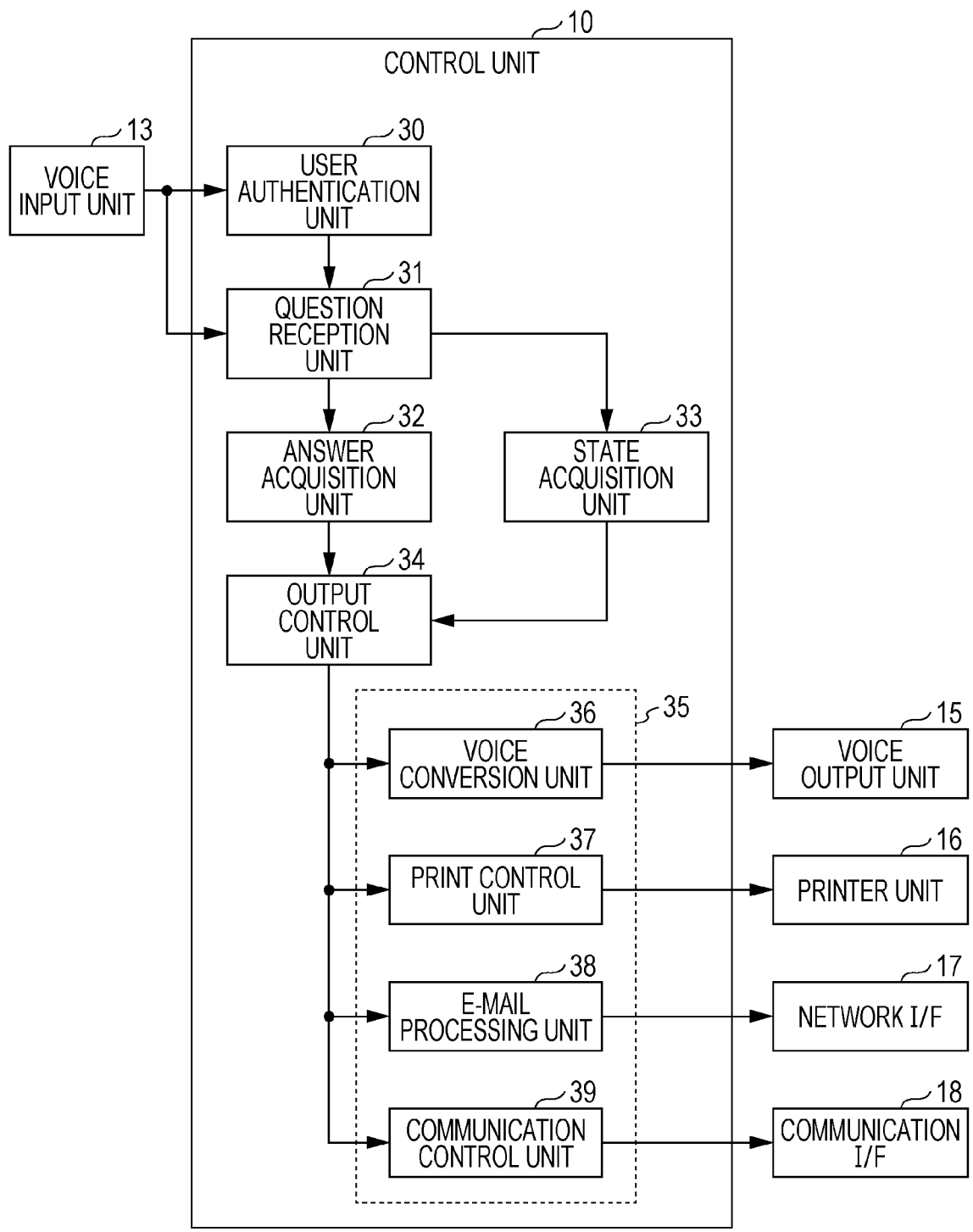
FIG. 4 is a block diagram showing a functional configuration of the voice information processing apparatus according to one or more embodiments.

FIG. 4 is a block diagram showing a functional configuration of the voice information processing apparatus 3. The CPU 10*a* of the control unit 10 executes the program 21, thereby causing the control unit 10 to function as the various processing units shown in FIG. 4. Specifically, the control unit 10 functions as a user authentication unit 30, a question reception unit 31, an answer acquisition unit 32, a state acquisition unit 33, an output control unit 34, and an answer output unit 35. The answer output unit 35 includes a voice conversion unit 36 that converts text into voice and outputs the voice to the voice output unit 15, a print control unit 37 that drives the printer unit 16 so that text and an image are printed on a sheet, an e-mail processing unit 38 that generates an e-mail and outputs the e-mail to the network interface 17, and a communication control unit 39 that communicates with the portable terminal 5 via the communication interface 18.

The user authentication unit 30 is a processing unit that authenticates a user who uses the voice information processing apparatus 3. When the user authentication unit 30 receives input of the user's voice via the voice input unit 13, it checks the voiceprint characteristics of the input voice against the voiceprint information of the user information 22, thereby performing voiceprint authentication. If the voiceprint characteristics of the input voice match the voiceprint information of the user information 22, the user can be identified, and thus the authentication is successful. If the authentication is successful as a result of the voiceprint authentication, the user authentication unit 30 causes the operating state of the voice information processing apparatus 3 to shift from a logged-out state to the logged-in state. This allows the user to ask the voice information processing apparatus 3 a question by voice. The authentication form used by the user authentication unit 30 is not limited to voiceprint authentication. Another authentication form may be used, such as password authentication, card authentication, or biometric authentication.

The question reception unit 31 is a processing unit that receives the user's voice question in the logged-in state. When voice is input to the voice input unit 13, the question reception unit 31 determines whether the input voice is a question. When the voice information processing apparatus 3 has shifted to the logged-in state, the user can cause it to execute a job, using the scan function, the print function, etc. of the image processing apparatus 2, and can perform job setting and execution instruction through voice operation. Thus, the question reception unit 31 determines whether the input voice matches a voice operation keyword, and if the input voice matches a voice operation keyword, the question reception unit 31 determines that the input voice is not a question. In this case, the input voice is interpreted as a voice operation in a job control unit (not shown) installed as a function of the image processing apparatus 2, and processing corresponding to the input voice is performed. On the other hand, if the input voice does not match any voice operation keyword, the question reception unit 31 determines that the input voice is a question.

When receiving the input voice as a question, the question reception unit 31 generates the question information D1 based on the input voice. At this time, as described above, the question reception unit 31 may generate the question information D1 including voice information of the input voice as it is, or may convert the input voice into text data and generate the question information D1 including the text data. The question reception unit 31 that has generated the question information D1 outputs the question information D1 to the answer acquisition unit 32, and requests the state acquisition unit 33 to acquire the state information D4 indicating the state of the logged-in user.

Upon acquiring the question information D1 from the question reception unit 31, the answer acquisition unit 32 transmits the question information D1 to the answer search server 7, thereby requesting an answer to the question from the answer search server 7. Then, the answer acquisition unit 32 acquires the answer information D3 from the answer search server 7. The answer information D3 includes at least text data. The answer information D3 may include image data in addition to the text data. The answer acquisition unit 32 that has acquired the answer information D3 outputs the answer information D3 to the output control unit 34.

As the logged-in user's question is received in the question reception unit 31, the state acquisition unit 33 transmits the state inquiry D2 designating the logged-in user to the management server 8. Then, the state acquisition unit 33 acquires the state information D4 indicating the state of the logged-in user from the management server 8. The state information D4 includes the schedule information D5 on the logged-in user as described above.

Figure 5:
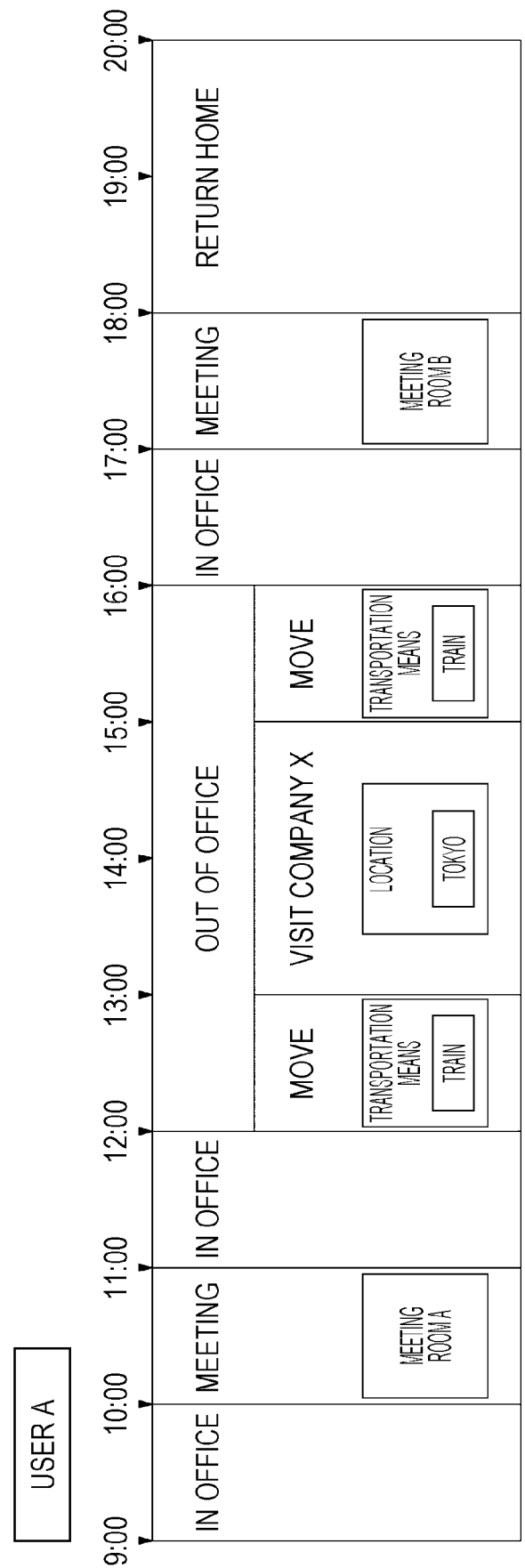
FIG. 5 is a diagram showing an example of schedule information according to one or more embodiments.

FIG. 5 is a diagram showing an example of the schedule information D5. As shown in FIG. 5, the schedule information D5 is information that records the daily action schedule of the logged-in user (user A). The schedule information D5 shown in FIG. 5 shows an example in which a meeting in a meeting room A is scheduled from 10:00 to 11:00, going out is scheduled from 12:00 to 16:00, and further a meeting in a meeting room B is scheduled from 17:00 to 18:00. If a going-out schedule of the logged-in user is recorded in the schedule information D5, the going-out schedule includes information such as a destination, a travel time and a transportation means to go to the destination, a time to be spent in the destination, and a travel time and a transportation means to return from the destination. Reference to the schedule information D5 like this enables calculation of a listening-possible time in which the user can listen to the answer information D3 when the answer information D3 is output by voice. For example, if the user asks a question at 11:59, the listening-possible time in which the user can listen to an answer to the question is one minute.

The state acquisition unit 33 that has acquired the state information D4 including the schedule information D5 as described above outputs the state information D4 to the output control unit 34.

The output control unit 34 is a processing unit that determines the output mode of the answer information D3 and controls the answer output unit 35. The output control unit 34 selects an output mode of the answer information D3 from among a plurality of output modes, based on the answer information D3 and the state information D4. The output control unit 34 reads the determination information 23 from the storage device 11, and determines the output mode of the answer information D3 according to rules established in the determination information 23.

FIGS. 6A and 6B are diagrams showing an example of the determination information 23. FIG. 6A shows a case where the type of answer information D3 is text data, and FIG. 6B shows a case where the type of answer information D3 is image data. The determination information 23 is table information that allows determination of the output mode based on the type of answer information D3, whether confidential information is included, required output time required to complete the output of the answer information D3 when it is output by voice, and the contents of the schedule information D5.

Text data included in the answer information D3 is data that can be converted into voice information to be output by voice. On the other hand, image data such as a figure, a photograph, or a map included in the answer information D3 is data that cannot be output by voice. Therefore, in the determination information 23, text data and image data are distinguished to be associated with output modes. That is, text data output modes include voice output, whereas image data output modes do not include voice output.

The answer search server 7 can access an intra-company database to acquire an answer to a question. Thus, the answer information D3 may include confidential information. Such confidential information may have access authority set for each user, and may include information that cannot be accessed by users other than the logged-in user. Thus, if the answer information D3 includes confidential information, voice output based on the answer information D3 may leak the confidential information to other users around the logged-in user. The same applies to print output based on the answer information D3. If the printed matter is collected by a user other than the logged-in user, confidential information may be leaked. Therefore, in the determination information 23, it is prescribed that if the answer information D3 includes confidential information, e-mail transmission be selected as the output mode of the answer information D3. This applies to both text data and image data. In place of e-mail transmission, the mode of outputting the answer information D3 through direct transmission to the portable terminal 5 may be selected. This applies to a case where e-mail transmission is selected as the output mode of the answer information D3 due to another condition being met.

If voice output is performed based on text data included in the answer information D3, taking long time (required output time Tx) from the start of the voice output until the end, the user may not be able to remember all information output by voice and effectively use the information included in the answer information D3. Therefore, in the determination information 23 shown in FIG. 6A, it is prescribed that if the required output time Tx when voice output is performed is longer than or equal to a preset time T1 (hereinafter referred to as a "set time T1"), voice output be disallowed, and an output mode different from voice output be selected as the output mode of the answer information D3. The set time T1 in this case is preset to a time of about five minutes, for example. However, the set time T1 can be changed appropriately by the user or an administrator of the voice information processing apparatus 3.

In the determination information 23, it is prescribed that if the required output time Tx is longer than or equal to the set time T1, an output mode of the answer information D3 be selected from among a plurality of output modes except voice output, based on the schedule information D5 of the logged-in user. For example, it is prescribed that if no going out and meetings are scheduled in the subsequent schedule of the logged-in user, e-mail transmission be selected as the output mode of the answer information D3. It is also prescribed that if going out or a meeting is scheduled in the subsequent schedule of the logged-in user, one of the output modes of e-mail transmission and print output be selected.

By the answer information D3 being transmitted as an e-mail to the logged-in user's address, the user can receive the e-mail using the user's information processing terminal 6 even after leaving for a destination or a meeting, to effectively use the information included in the answer information D3. The same applies to a case where the answer information D3 is directly transmitted to the portable terminal 5 instead of being transmitted by e-mail.

However, if electrical energy with which the information processing terminal 6 has been charged in advance is exhausted, the information processing terminal 6 will not start, so that the user cannot use the information included in the answer information D3 while being out or during the meeting. In particular, if the going-out time (including the meeting time) of the user is long, it is highly likely that the electrical energy with which the information processing terminal 6 has been charged in advance will be exhausted. Thus, in the determination information 23 shown in FIG. 6A, whether to perform print output is determined depending on the going-out time (including the meeting time) of the logged-in user and whether the logged-in user's environment will be an environment that allows charging. Specifically, in the determination information 23, it is prescribed that when the going-out time (meeting time) will be longer than or equal to a predetermined time T2, and the user will not be in an environment that allows the information processing terminal 6 to be charged, print output be performed as the output mode of the answer information D3. This is because even if the information processing terminal 6 does not start, the answer information D3 having been printed out allows the user to use the information included in the answer information D3 by referring to the answer information D3 printed on a printed matter. On the other hand, if the going-out time (meeting time) will be less than the predetermined time T2, or if the user will be in an environment that allows the information processing terminal 6 to be charged even if the going-out time (meeting time) will be longer than or equal to the predetermined time T2, it is unlikely that the electrical energy of the information processing terminal 6 will be exhausted, and thus e-mail transmission is selected as the output mode of the answer information D3. The predetermined time T2 in this case can be set as appropriate, and is preset, for example, to about five hours.

On the other hand, when the required output time Tx for voice output is less than the set time T1, the user can remember the information output by voice. Therefore, voice output is included as a candidate when the output mode of the answer information D3 is determined. However, if going out, a meeting, or the like is scheduled in the subsequent schedule of the logged-in user who has asked a question, and a short time is left before the logged-in user leaves for the destination or the meeting, the user may not be able to listen to the information output by voice to the end. Therefore, in the determination information 23 shown in FIG. 6A, it is prescribed that also when the required output time Tx is less than the set time T1, the output mode be determined based on the schedule information D5 of the logged-in user. For example, it is prescribed that if the logged-in user is not scheduled to go out or have a meeting, voice output be selected as the output mode of the answer information D3. On the other hand, if the logged-in user is scheduled to go out or have a meeting, whether to perform voice output is determined depending on whether the logged-in user can listen to the content of the answer information D3 output by voice to the end by the time the logged-in user leaves.

In the example of FIG. 6A, it is prescribed that if the logged-in user can listen to the content of the answer information D3 to the end, voice output be selected as the output mode of the answer information D3. However, in this case, e-mail transmission may be additionally performed in addition to the voice output of the answer information D3.

Also, in the determination information 23, it is prescribed that if the logged-in user cannot listen to the content of the answer information D3 to the end by the time the logged-in user leaves, an output mode other than voice output be selected as the output mode of the answer information D3. Specifically, in this case, as the output mode of the answer information D3, one of the output modes of e-mail transmission and print output is selected. For example, whether to perform print output based on the answer information D3 is determined, as in the above-described case where the required output time Tx is longer than or equal to the set time T1, depending on the going-out time (including the meeting time) of the logged-in user and whether the logged-in user's environment will be an environment that allows charging.

If the answer information D3 includes image data, the output mode of the image data is determined based on the determination information 23 shown in FIG. 6B. In the determination information 23 shown in FIG. 6B, if the image data does not include confidential information, one output mode is selected from e-mail transmission and print output, based on the schedule information D5 of the logged-in user. For example, it is prescribed that if no going out and meetings are scheduled in the subsequent schedule of the logged-in user, e-mail transmission be selected as the output mode of the answer information D3. It is also prescribed that if going out or a meeting is scheduled in the subsequent schedule of the logged-in user, one of the output modes of e-mail transmission and print output be selected. For example, whether to perform print output based on the answer information D3 is determined, as in the case of text data, depending on the going-out time (including the meeting time) of the logged-in user and whether the logged-in user's environment will be an environment that allows charging.

Returning to FIG. 4, the output control unit 34 determines the output mode of the answer information D3 based on the determination information 23 described above. The output control unit 34 extracts text data from the answer information D3, and calculates the required output time Tx when voice output based on the text data is performed. For example, the output control unit 34 calculates the required output time Tx, based on the length of text (a character string) included in the text data and voice reproduction speed. If the required output time Tx is less than the set time T1, voice output based on the answer information D3 remains as a candidate for the output mode to be determined. The output control unit 34 refers to the schedule information D5 of the logged-in user. If going out, a meeting, or the like is scheduled in the logged-in user's subsequent schedule, the output control unit 34 calculates a listening-possible time Th of the logged-in user, based on time left before the logged-in user leaves. Then, based on the required output time Tx and the listening-possible time Th, the output control unit 34 determines whether the logged-in user can listen to the voice output based on the answer information D3 to the end. As a result, if the logged-in user can listen to the voice output based on the answer information D3 to the end, the output control unit 34 selects the voice output based on the answer information D3 as the output mode of the answer information D3. At this time, the output control unit 34 may additionally select an output mode other than voice output.

On the other hand, if the user cannot listen to the voice output based on the answer information D3 to the end, the output control unit 34 selects an output mode other than voice output as the output mode of the answer information D3. At this time, the output control unit 34 determines the going-out time (including the meeting time) of the user and whether a place to which the user will go is an environment that allows charging, based on the schedule information D5 of the logged-in user, and selects an output mode according to the determination result. Whether the place is an environment that allows charging can be determined based on a transportation means to be used by the user or the user's destination. For example, if the transportation means to be used by the user is provided with electrical plug outlets like the Japanese Shinkansen etc., the output control unit 34 determines that it is an environment that allows charging. Also, if the destination to be visited by the user is provided with electrical plug outlets, the output control unit 34 determines that it is an environment that allows charging. On the other hand, if the transportation means and the destination are not provided with electrical plug outlets, or if it is unclear whether they are provided with electrical plug outlets, the output control unit 34 determines that it is not an environment that allows charging.

Furthermore, the output control unit 34 determines whether the text data includes confidential information. For example, the output control unit 34 determines whether the text data includes a predetermined character string indicating confidential information. If the predetermined character string is included, the output control unit 34 determines that the text data includes confidential information. If the text data includes confidential information, the output control unit 34 selects e-mail transmission or direct transmission to the portable terminal 5 as the output mode of the text data. A method for determining whether text data includes confidential information is not limited to the above-described method.

When the answer information D3 includes image data, the output control unit 34 determines the output mode of the image data, based on the determination information 23 in FIG. 6B. At this time also, the output control unit 34 determines whether the image data includes confidential information. For example, the output control unit 34 determines whether the image data includes a watermark, a stamp image, or the like that indicates confidential information. If a watermark, a stamp image, or the like is included, the output control unit 34 determines that the image data includes confidential information. If the image data includes confidential information, the output control unit 34 selects e-mail transmission as the output mode of the image data. If the image data does not include confidential information, the output control unit 34 refers to the schedule information D5 of the logged-in user to determine whether going out, a meeting, or the like is scheduled in the logged-in user's subsequent schedule. If going out, a meeting, or the like is scheduled, the output control unit 34 further determines the going-out time (including the meeting time) of the user and whether the user's destination is an environment that allows charging. Then, the output control unit 34 selects one of the output modes of e-mail transmission and print output according to the determination result. A method for determining whether image data includes confidential information is not limited to the above-described method.

When the output control unit 34 selects voice output as the output mode of the answer information D3, it outputs the answer information D3 to the voice conversion unit 36. In this case, the voice conversion unit 36 converts the text data included in the answer information D3 into voice information and outputs it to the voice output unit 15. Consequently, voice corresponding to the text data included in the answer information D3 is output from the voice output unit 15.

When the output control unit 34 selects print output as the output mode of the answer information D3, it outputs the answer information D3 to the print control unit 37. In this case, the print control unit 37 generates print data based on the text data and image data included in the answer information D3, and outputs the print data to the printer unit 16. Consequently, the printer unit 16 performs print output based on the text data and image data included in the answer information D3.

When the output control unit 34 selects e-mail transmission as the output mode of the answer information D3, it outputs the answer information D3 to the e-mail processing unit 38. In this case, the e-mail processing unit 38 acquires the e-mail address of the logged-in user by referring to the user information 22, and creates an e-mail in which the address is designated as the transmission destination. Then, the e-mail processing unit 38 attaches the answer information D3 to the created e-mail for transmission. Thus, the e-mail to which the answer information D3 is attached is transmitted to the logged-in user's address via the network interface 17.

When the output control unit 34 selects direct transmission to the portable terminal 5 in place of e-mail transmission as the output mode of the answer information D3, it outputs the answer information D3 to the communication control unit 39. In this case, the communication control unit 39 directly transmits the answer information D3 to the portable terminal 5 carried by the logged-in user via the communication interface 18.

Next, an example of a specific procedure performed in the voice information processing apparatus 3 will be described. FIGS. 7 to 10 are flowcharts showing an example of a procedure performed by the voice information processing apparatus 3. This procedure is processing performed by the CPU 10a of the control unit 10 executing the program 21. First, as shown in FIG. 7, when the voice information processing apparatus 3 detects a user's voice input (step S10), it performs voiceprint authentication based on the input voice (step S11) to identify the user (step S12). When the user can be identified, the voice information processing apparatus 3 shifts the operating state to the logged-in state (step S13). With this, the user can ask the voice information processing apparatus 3 a question by voice.

The voice information processing apparatus 3 that has shifted the operating state to the logged-in state receives the user's voice question (step S14). The user's question is not necessarily input by voice, and may be input by the user manually operating the operating panel 12. Even through a manual operation by the user, the voice information processing apparatus 3 receives a question input by the user in step S14. Upon receiving the question, the voice information processing apparatus 3 generates the question information D1 (step S15), and transmits the question information D1 to the answer search server 7, thereby acquiring the answer information D3 from the answer search server 7 (step S16). In parallel with the processing to acquire the answer information D3 to the question, the voice information processing apparatus 3 transmits the state inquiry D2 to the management server 8, thereby acquiring the state information D4 on the logged-in user from the management server 8 (step S17).

Upon acquiring the answer information D3 and the state information D4, the voice information processing apparatus 3 performs output mode determination processing (step S18). This processing is processing performed by the output control unit 34 described above, and is processing to select an output mode to output the answer information D3, based on the answer information D3 and the state information D4. Specifically, as the output mode of the answer information D3, at least one output mode is selected from voice output, print output, and e-mail transmission. Then, the voice information processing apparatus 3 performs answer output processing to output the answer information D3, based on the output mode determined in step S18 (step S19).

Through the above-described procedure, the voice information processing apparatus 3 can receive a voice question from the user, acquire the answer information D3 to the question, and provide the answer information D3 to the user in an appropriate mode.

Figure 8:
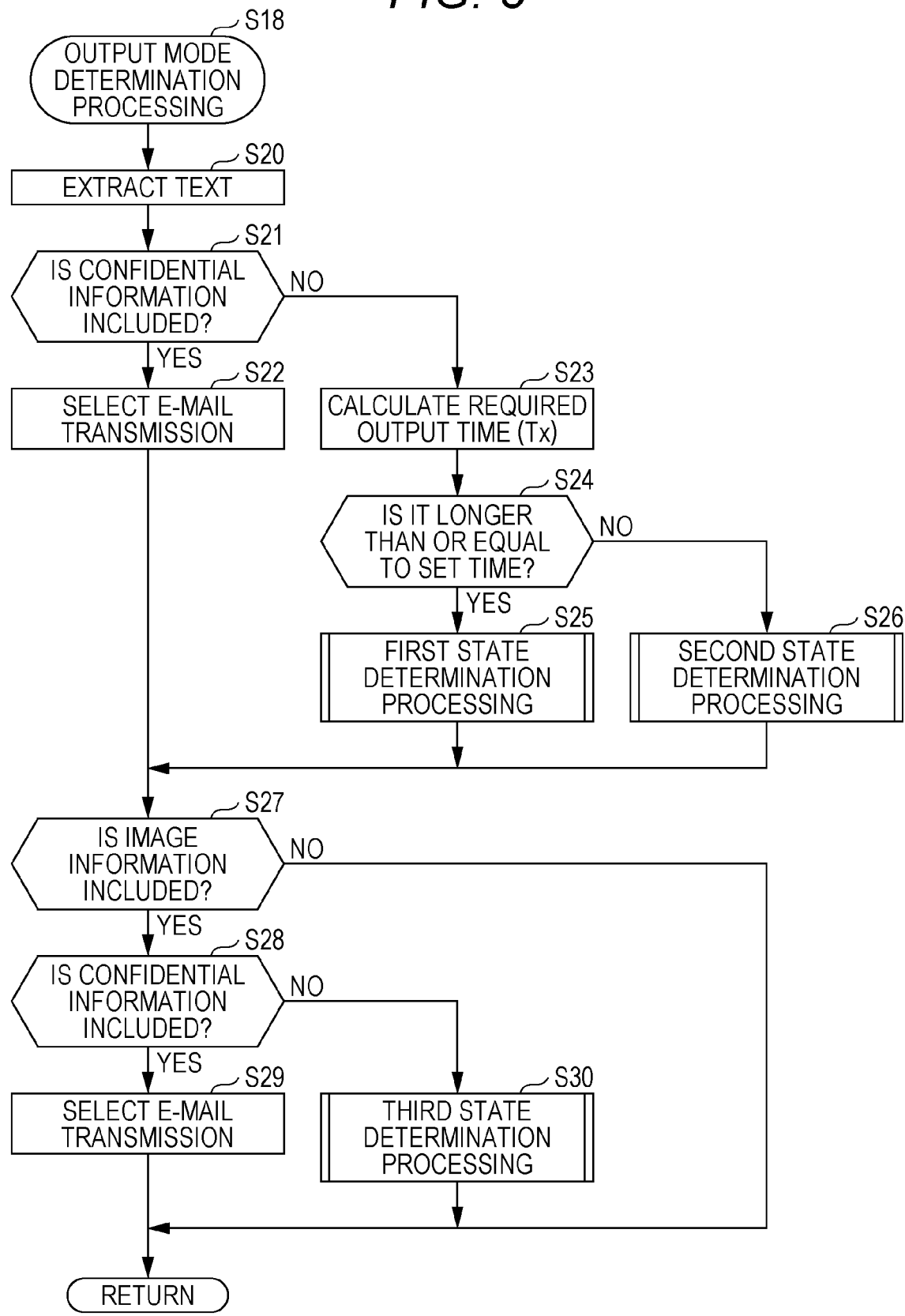
FIG. 8 is a flowchart showing an example of a detailed procedure of output mode determination processing according to one or more embodiments.

FIG. 8 is a flowchart showing an example of a detailed procedure of the output mode determination processing (step S18). Upon starting the output mode determination processing, the voice information processing apparatus 3 first extracts text data from the answer information D3 (step S20). The voice information processing apparatus 3 determines whether the text data includes confidential information (step S21). If confidential information is included (YES in step S21), the voice information processing apparatus 3 selects e-mail transmission as the output mode of the text data included in the answer information D3 (step S22). At this time, in place of the output mode by e-mail transmission, the voice information processing apparatus 3 may select the output mode by direct transmission to the portable terminal 5. For example, the voice information processing apparatus 3 may present e-mail transmission and direct transmission to the portable terminal 5 to the user, receive a selection operation by the user, and select direct transmission to the portable terminal 5 in place of e-mail transmission if the user selects direct transmission to the portable terminal 5. If a plurality of output modes is selected by the user, the voice information processing apparatus 3 may select the plurality of output modes.

On the other hand, if the text data does not include confidential information (NO in step S21), the voice information processing apparatus 3 calculates the required output time Tx required for voice output based on the answer information D3 to complete if the voice output is performed (step S23). Then, the voice information processing apparatus 3 determines whether the required output time Tx is longer than or equal to the predetermined set time T1 (step S24).

If the required output time Tx is longer than or equal to the set time T1 (YES in step S24), the voice information processing apparatus 3 executes first state determination processing (step S25). In the first state determination processing, the voice output based on the answer information D3 is disallowed since the voice output takes a long time to complete, and at least one output mode is selected from among a plurality of output modes except voice output, based on the state information D4 acquired from the management server 8. Details of the first state determination processing will be described later.

If the required output time Tx is less than the set time T1 (NO in step S24), the voice information processing apparatus 3 executes second state determination processing (step S26). In the second state determination processing, the voice output based on the answer information D3 is allowed. It is determined whether the user can listen to the voice output to the end, based on the state information D4 acquired from the management server 8. According to the determination result, at least one output mode is selected from among a plurality of output modes including voice output. Details of the second state determination processing will also be described later.

Next, the voice information processing apparatus 3 determines whether the answer information D3 includes image data (step S27). If no image data is included (NO in step S27), the output mode determination processing completes. On the other hand, if image data is included (YES in step S27), the voice information processing apparatus 3 determines whether the image data includes confidential information (step S28). If confidential information is included (YES in step S28), e-mail transmission is selected as the output mode of the image data included in the answer information D3 (step S29). At this time also, in place of the output mode by e-mail transmission, the voice information processing apparatus 3 may select the output mode by direct transmission to the portable terminal 5.

On the other hand, if the image data does not include confidential information (NO in step S28), the voice information processing apparatus 3 executes third state determination processing (step S30). In the third state determination processing, at least one output mode is selected from among a plurality of output modes except voice output, based on the state information D4 acquired from the management server 8. Details of the third state determination processing will be described later. That completes the output mode determination processing.

Figure 9:
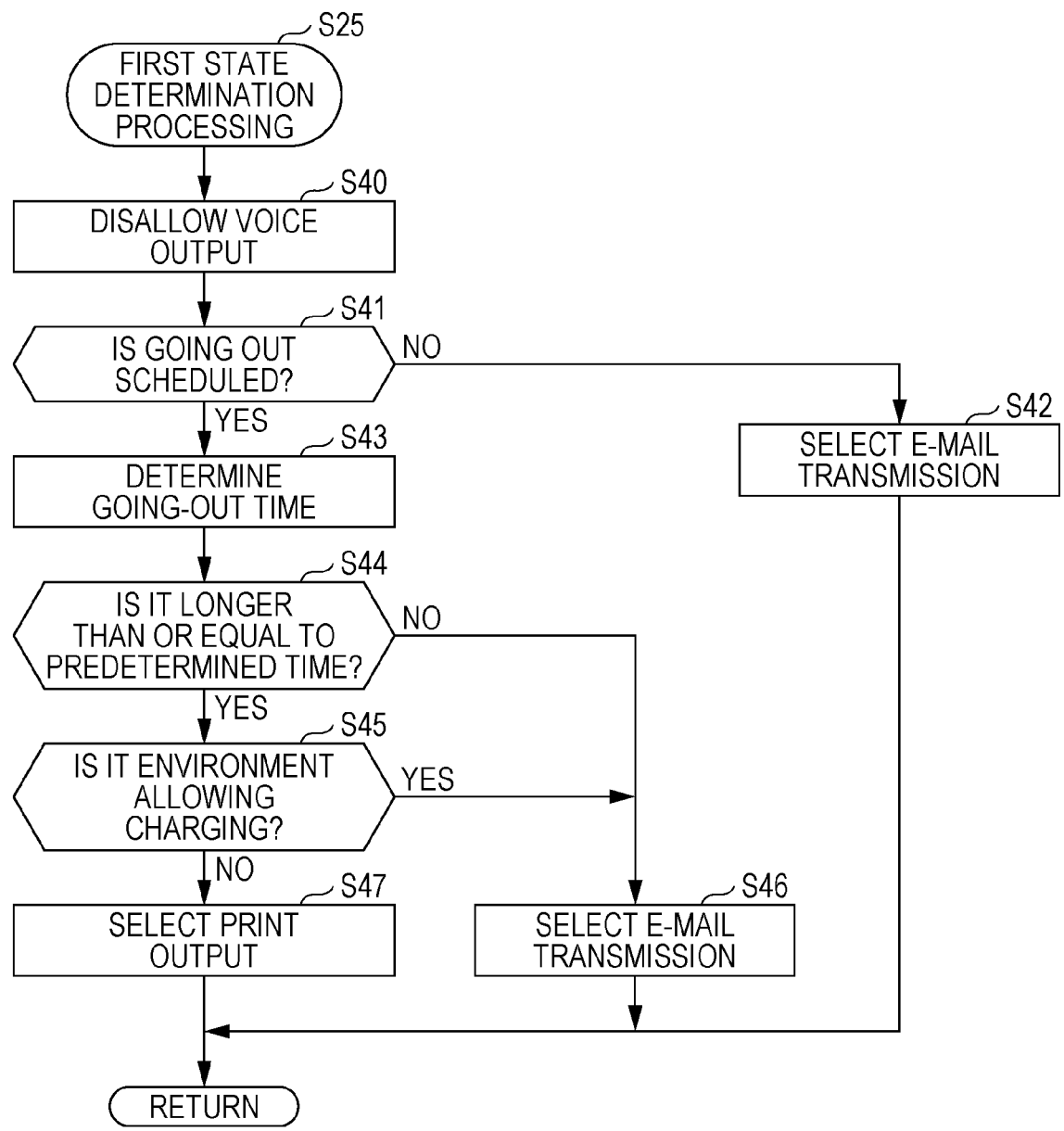
FIG. 9 is a flowchart showing an example of a detailed procedure of first state determination processing according to one or more embodiments.

FIG. 9 is a flowchart showing an example of a detailed procedure of the first state determination processing (step S25). Upon starting the first state determination processing, the voice information processing apparatus 3 first disallows the voice output based on the answer information D3 (step S40). Thus, voice output is excluded from the candidates for the output mode of the answer information D3. Then, the voice information processing apparatus 3 refers to the schedule information D5 of the logged-in user, and determines whether scheduled going out (including a scheduled meeting) is registered in the logged-in user's subsequent schedule (step S41). As a result, if no scheduled going out is registered (NO in step S41), the voice information processing apparatus 3 selects e-mail transmission from among the plurality of output modes except voice output as the output mode of the text data (step S42). At this time, in place of the output mode by e-mail transmission, the voice information processing apparatus 3 may select the output mode by direct transmission to the portable terminal 5.

On the other hand, if scheduled going out is registered (YES in step S41), the voice information processing apparatus 3 determines the going-out time Tz based on the schedule information D5 of the logged-in user (step S43), and determines whether the going-out time Tz of the logged-in user is longer than or equal to the predetermined time T2 (step S44). If the going-out time Tz of the logged-in user is longer than or equal to the predetermined time T2 (YES in step S44), the voice information processing apparatus 3 determines whether the logged-in user's destination is an environment that allows charging (step S45). If the going-out time Tz of the logged-in user is less than the predetermined time T2 (NO in step S44), or if the logged-in user's destination is an environment that allows charging (YES in step S45), the voice information processing apparatus 3 selects e-mail transmission as the output mode of the text data (step S46). At this time also, in place of the output mode by e-mail transmission, the voice information processing apparatus 3 may select the output mode by direct transmission to the portable terminal 5.

If the going-out time Tz of the logged-in user is longer than or equal to the predetermined time T2 (YES in step S44), and the logged-in user's destination is not an environment that allows charging (NO in step S45), the voice information processing apparatus 3 selects print output as the output mode of the text data (step S47). By printing out the text data beforehand, even if the electrical energy of the information processing terminal 6 is exhausted while the user is out, the user can use the information included in the answer information D3 by bringing the printed matter. That completes the first state determination processing.

Figure 10:
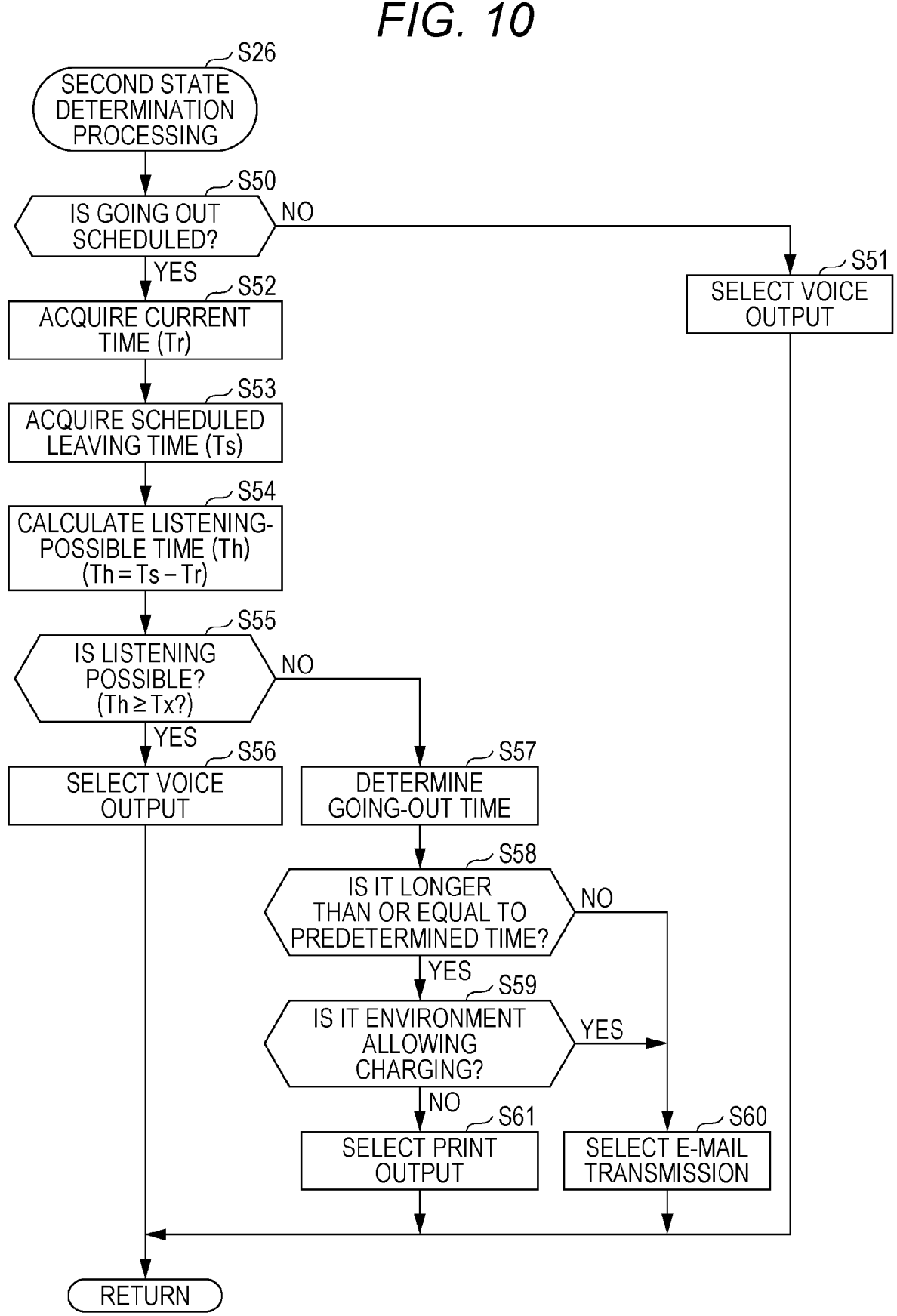
FIG. 10 is a flowchart showing an example of a detailed procedure of second state determination processing according to one or more embodiments.

Next, FIG. 10 is a flowchart showing an example of a detailed procedure of the second state determination processing (step S26). Upon starting the second state determination processing, the voice information processing apparatus 3 first refers to the schedule information D5 of the logged-in user, and determines whether scheduled going out (including a scheduled meeting) is registered in the logged-in user's subsequent schedule (step S50). As a result, if no scheduled going out is registered (NO in step S50), the voice information processing apparatus 3 selects voice output as the output mode of the text data (step S51).

On the other hand, if scheduled going out is registered (YES in step S50), the voice information processing apparatus 3 acquires the current time Tr measured by an internal clock circuit (step S52). The voice information processing apparatus 3 also acquires the scheduled leaving time Ts of the logged-in user, based on the schedule information D5 of the logged-in user (step S53). Then, the voice information processing apparatus 3 calculates the listening-possible time Th in which the logged-in user can listen to the voice output before leaving, based on the current time Tr and the scheduled leaving time Ts (step S54). For example, the voice information processing apparatus 3 calculates the difference between the current time Tr and the scheduled leaving time Ts of the logged-in user as the listening-possible time Th. Then, the voice information processing apparatus 3 compares the required output time Tx and the listening-possible time Th to determine whether the logged-in user can listen to the voice output based on the answer information D3 to the end (step S55). Specifically, if the listening-possible time Th of the logged-in user is longer than or equal to the required output time Tx, the voice information processing apparatus 3 determines that the logged-in user can listen to the voice output to the end. On the other hand, if the required output time Tx is longer than the listening-possible time Th of the logged-in user, the voice information processing apparatus 3 determines that the logged-in user cannot listen to the voice output to the end.

If the logged-in user can listen to the voice output to the end (YES in step S55), the voice information processing apparatus 3 selects voice output as the output mode of the text data (step S56). Consequently, an answer to the user's question is output by voice.

On the other hand, if the logged-in user cannot listen to the voice output to the end (NO in step S55), the voice information processing apparatus 3 determines the going-out time Tz of the logged-in user (step S57), and determines whether it is longer than or equal to the predetermined time T2 (step S58). If the going-out time Tz of the logged-in user is longer than or equal to the predetermined time T2 (YES in step S58), the voice information processing apparatus 3 determines whether the logged-in user's destination is an environment that allows charging (step S59). If the going-out time Tz of the logged-in user is less than the predetermined time T2 (NO in step S58), or if the logged-in user's destination is an environment that allows charging (YES in step S59), the voice information processing apparatus 3 selects e-mail transmission as the output mode of the text data (step S60). At this time, in place of e-mail transmission, the voice information processing apparatus 3 may select direct transmission to the portable terminal 5.

If the going-out time Tz of the logged-in user is longer than or equal to the predetermined time T2 (YES in step S58), and the logged-in user's destination is not an environment that allows charging (NO in step S59), the voice information processing apparatus 3 selects print output as the output mode of the text data (step S61). By printing out the text data beforehand, even if the electrical energy of the information processing terminal 6 is exhausted while the user is out, the user can use the information included in the answer information D3 by bringing the printed matter. That completes the second state determination processing.

Figure 11:
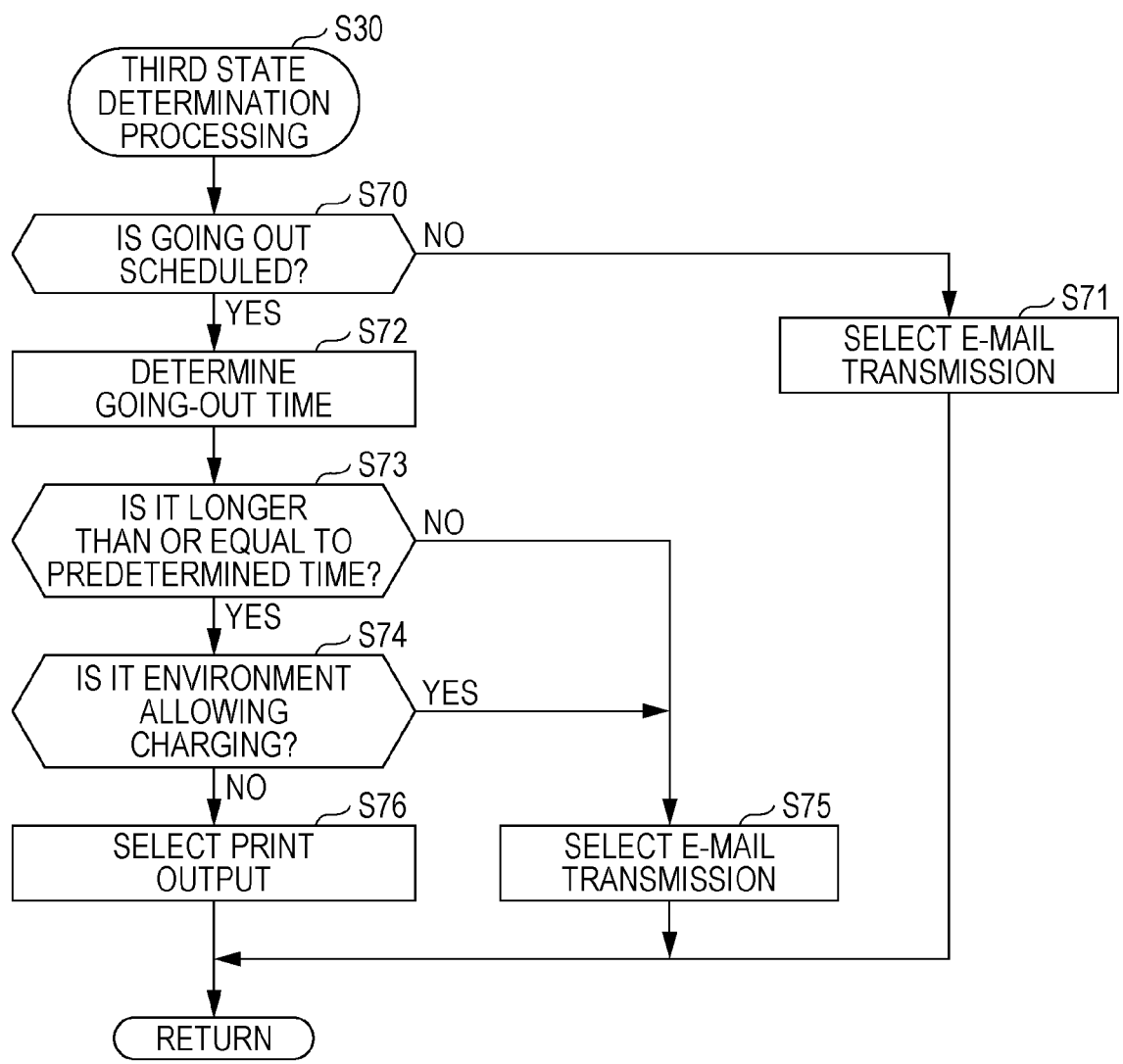
FIG. 11 is a flowchart showing an example of a detailed procedure of third state determination processing according to one or more embodiments.

Next, FIG. 11 is a flowchart showing an example of a detailed procedure of the third state determination processing (step S30). Upon starting the third state determination processing, the voice information processing apparatus 3 refers to the schedule information D5 of the logged-in user, and determines whether scheduled going out (including a scheduled meeting) is registered in the logged-in user's subsequent schedule (step S70). As a result, if no scheduled going out is registered (NO in step S70), the voice information processing apparatus 3 selects e-mail transmission from among a plurality of output modes except voice output as the output mode of the image data (step S71). At this time, in place of the output mode by e-mail transmission, the voice information processing apparatus 3 may select the output mode by direct transmission to the portable terminal 5.

On the other hand, if scheduled going out is registered (YES in step S71), the voice information processing apparatus 3 determines the going-out time Tz based on the schedule information D5 of the logged-in user (step S72), and determines whether the going-out time Tz of the logged-in user is longer than or equal to the predetermined time T2 (step S73). If the going-out time Tz of the logged-in user is longer than or equal to the predetermined time T2 (YES in step S73), the voice information processing apparatus 3 determines whether the logged-in user's destination is an environment that allows charging (step S74). If the going-out time Tz of the logged-in user is less than the predetermined time T2 (NO in step S73), or if the logged-in user's destination is an environment that allows charging (YES in step S74), the voice information processing apparatus 3 selects e-mail transmission as the output mode of the image data (step S75). At this time also, in place of the output mode by e-mail transmission, the voice information processing apparatus 3 may select the output mode by direct transmission to the portable terminal 5.

If the going-out time Tz of the logged-in user is longer than or equal to the predetermined time T2 (YES in step S73), and the logged-in user's destination is not an environment that allows charging (NO in step S74), the voice information processing apparatus 3 selects print output as the output mode of the image data (step S76). By printing out the image data beforehand, even if the electrical energy of the information processing terminal 6 is exhausted while the user is out, the user can use the information included in the answer information D3 by bringing the printed matter. That completes the third state determination processing.

By performing the processing as described above, the voice information processing apparatus 3 can provide the answer information D3 to the user who has asked a question in a mode that allows effective use of the information. For example, if the user asks a question immediately before going out, the voice information processing apparatus determines whether the user can listen to an answer to the end. If the user can listen to the answer to the end, the voice information processing apparatus performs voice output based on the answer information D3. On the other hand, if the user cannot listen to the answer to the end, the voice information processing apparatus 3 provides the answer information D3 to the user in an output mode such as e-mail transmission or print output without performing voice output. Consequently, the user can effectively use the answer acquired from the voice information processing apparatus 3 even where the user has gone to.

If the required output time Tx is longer than or equal to the predetermined set time T1, the voice information processing apparatus 3 also provides the answer information D3 to the user in an output mode such as e-mail transmission or print output without performing voice output. Therefore, there is also an advantage that the user does not need to remember the content of the answer information D3 provided from the voice information processing apparatus 3, and can refer to the answer information D3 at any time, and can effectively use information included in the answer information D3.

The present invention is not limited to the content described in the above embodiments, and various modifications can be applied.

For example, the above embodiments have described the example in which the image processing apparatus 2 such as an MFP functions as the voice information processing apparatus 3. However, the voice information processing apparatus 3 is not limited to being provided as a part of the image processing apparatus 2, and may be configured as a single unit. For example, the voice information processing apparatus 3 can be implemented by the above-described program 21 being executed on a general computer. In this case, the image processing apparatus 2 and the voice information processing apparatus 3 are connected to each other via the network 9. Thus, when the voice information processing apparatus 3 selects print output as the output mode of the answer information D3, it may generate a print job based on the answer information D3, and transmit the print job to the image processing apparatus 2 via the network 9, thereby causing the image processing apparatus 2 to perform print output.

The above embodiments have described the example in which the answer search server 7 is provided separately from the voice information processing apparatus 3. However, the above-described function of the answer search server 7 may be included in the voice information processing apparatus 3.

The above embodiments have described the example in which the voice information processing apparatus 3 makes an inquiry to the management server 8, thereby acquiring the state information D4 on the logged-in user from the management server 8. However, a method for acquiring the state information D4 of the user who has asked a question is not limited to this. For example, when the voice information processing apparatus 3 receives a user's voice question, it may ask the user about the user's future schedule or the like, and receive further input of the state information D4 by the user. In this case, the user may input the user's schedule or the like by voice, or may input it by a manual operation.

The above embodiments have described the example in which the voice information processing apparatus 3 is assumed to be installed in an office. However, the above-described voice information processing apparatus 3 is not limited to office use, and can be used for general household use.

Further, the above embodiments have illustrated the case where the program 21 executed by the CPU 10a of the control unit 10 is prestored in the storage device 11. However, the program 21 may be installed or updated in the voice information processing apparatus 3 via the network interface 17, the communication interface 18, or the like, for example. In this case, the program 21 is provided in a form that can be downloaded via the Internet or the like. The program 21 is not limited to this, and may be provided in a form recorded on a computer-readable recording medium such as a CD-ROM or a USB memory.

Although the embodiments of the present invention have been described and illustrated in detail, the disclosed embodiments are made for purposes of illustration and example only and not limitation. The scope of the present invention should be interpreted by terms of the appended claims.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A voice information processing apparatus, comprising:
a hardware processor that:
receives a user question;
acquires answer information responsive to the received question;
acquires state information on a user state; and
selects an output mode of the answer information from among a plurality of output modes, based on the answer information and the state information, wherein the plurality of output modes comprises a voice output mode; and
an output device that outputs the answer information in the selected output mode, wherein
the state information includes schedule information on a user schedule, and
the hardware processor:
calculates a required output time once the answer information is output by voice;
calculates a listening-possible time based on the schedule information; and
the required output time being longer than the listening-possible time, selects an output mode different from the voice output mode as the output mode of the answer information.

2. The voice information processing apparatus according to claim 1, wherein
the plurality of output modes further comprises a print output mode that prints based on the answer information, and
upon determining that the required output time is longer than the listening-possible time, the hardware processor selects the print output mode as the output mode of the answer information.

3. The voice information processing apparatus according to claim 1, wherein, upon determining that the required output time is shorter than the listening-possible time, the hardware processor selects the voice output mode as the output mode of the answer information.

4. The voice information processing apparatus according to claim 1, wherein, upon determining that the answer information includes confidential information, the hardware processor selects an output mode different from the voice output mode as the output mode of the answer information.

5. The voice information processing apparatus according to claim 1, wherein
the hardware processor further:
performs voiceprint authentication based on a user voice and identifies the user; and
acquires the state information associated with the identified user.

6. A non-transitory recording medium storing a computer readable program executed on a computer to cause the computer to:
receive a user question;
acquire answer information responsive to the received question;
acquire state information on a user state;
select an output mode of the answer information from among a plurality of output modes, based on the answer information and the state information, wherein the plurality of output modes comprises a voice output mode; and
output the answer information in the selected output mode, wherein
the state information includes schedule information on a user schedule, and
the computer:
calculates a required output time once the answer information is output by voice;
calculates a listening-possible time based on the schedule information; and
the required output time being longer than the listening-possible time, selects an output mode different from the voice output mode as the output mode of the answer information.

7. The non-transitory recording medium according to claim 6, wherein
the plurality of output modes further comprises a print output mode that prints based on the answer information, and
upon determining that the required output time is longer than the listening-possible time, the computer selects the print output mode as the output mode of the answer information.

8. The non-transitory recording medium according to claim 6, wherein upon determining that the required output time is shorter than the listening-possible time, the computer selects the voice output mode as the output mode of the answer information.

9. The non-transitory recording medium according to claim 6, wherein
upon determining that the answer information includes confidential information, the computer selects an output mode different from the voice output mode as the output mode of the answer information.

10. The non-transitory recording medium according to claim 6, wherein
the program further causes the computer to:
perform voiceprint authentication based on a user voice and identify the user; and
acquire the state information associated with the identified user.

* * * * *